United States Patent [19]

Klemm

[11] Patent Number: 5,255,590
[45] Date of Patent: Oct. 26, 1993

[54] CONTROL DEVICE FOR THE LOAD-DEPENDENT CONNECTION OF A HYDRAULIC STAND BY MOTOR TO A BASE-LOAD MOTOR

[75] Inventor: Guenter W. Klemm, Olpe, Fed. Rep. of Germany

[73] Assignee: Ing. Guenter Klemm Bohrtechnik GmbH, Fed. Rep. of Germany

[21] Appl. No.: 718,144

[22] Filed: Jun. 20, 1991

[30] Foreign Application Priority Data

Jun. 23, 1990 [DE] Fed. Rep. of Germany ....... 4020111

[51] Int. Cl.$^5$ .................. F15B 11/00; F16D 31/02
[52] U.S. Cl. ............................. 91/516; 91/517; 91/518; 60/425; 60/483
[58] Field of Search ............... 91/514, 516, 517, 518, 91/519, 511; 60/483, 484, 422, 424, 425, 426; 137/118

[56] References Cited

U.S. PATENT DOCUMENTS

| | | | |
|---|---|---|---|
| 2,500,627 | 7/1947 | Chinn | 60/425 X |
| 2,616,259 | 11/1952 | Quintilian | 91/517 X |
| 3,707,981 | 1/1973 | Sadler et al. | 137/118 X |
| 3,768,263 | 10/1973 | Olson et al. | 60/483 X |
| 3,849,985 | 11/1974 | Ratliff et al. | 60/483 |
| 4,015,679 | 4/1977 | Klitz | 60/483 X |
| 4,140,089 | 2/1979 | Kueny et al. | 137/510 X |
| 4,142,369 | 3/1979 | Mickelson | 91/420 X |
| 4,194,366 | 3/1980 | Petro | 60/483 |
| 4,276,896 | 7/1981 | Hunck et al. | 91/517 X |
| 4,306,840 | 12/1981 | Fassbender | 137/118 X |
| 4,556,078 | 12/1985 | Wittren | 137/118 |
| 4,579,044 | 4/1986 | Johnson | 91/519 |
| 5,069,111 | 12/1991 | Loffler et al. | 91/516 |

*Primary Examiner*—Edward K. Look
*Assistant Examiner*—John Ryznic
*Attorney, Agent, or Firm*—Diller, Ramik & Wight

[57] ABSTRACT

A hydraulic base-load motor (M1) drives a load with the working pressure generated at the motor rising with the load. When the working pressure reaches an upper limit pressure, a hydraulic stand-by motor (M2) is switched on. Since the pressure drops upon switching on the stand-by motor, the control device is designed such that, upon reaching a lower limit pressure, it deactivates the stand-by motor again, the lower limit pressure being less than half the upper limit pressure. This switching hysteresis prevents a repeated switching over of the stand-by motor.

8 Claims, 9 Drawing Sheets

CONTROL DEVICE FOR THE LOAD-DEPENDENT CONNECTION OF A HYDRAULIC STAND BY MOTOR TO A BASE-LOAD MOTOR

BACKGROUND OF THE INVENTION TITLE OF THE INVENTION

The invention relates to a control device for the load-dependent connection of a hydraulic stand-by motor to a base-load motor.

In ground-boring machines with a hydraulic rotational drive, e.g. rock drilling and gimlet machines, it is known to drive the drilling shaft with a rotational drive having two hydraulic motors. Normally, only one of the motors, i.e. the one forming the base-load motor, is activated. If the resistance against rotation increases so that the base-load motor is no longer able to provide the necessary torque, a stand-by motor is switched on which supports the base-load motor in such cases. Usually, both motors are of the same construction and have the same capacity. Both motors are permanently engaged with the same gear wheel of the rods to be rotated. The control device for connecting the stand-by motor consists of a manually operable valve arranged near both engines. In order to operate the control device, the operator must walk up to the control device disposed near the motors and switch it over. If the motors are arranged on a carriage that is displaceable along a derrick, an operator will have to climb the derrick in order to operate the control device. This is not only time-consuming and expensive, but also hazardous.

SUMMARY OF THE INVENTION

It is the object of the present invention to provide a control device of the kind defined in the precharacterising part of claim 1, which works automatically, causes no loss of time during switching and excludes malfunctions.

The object is solved, according to the present invention, with the features of claim 1.

In the control device of the present invention, the stand-by motor is connected in dependence of the working pressure prevailing at the base-load motor, when this working pressure has reached an upper limit value.

In a case where the hydraulic power is provided to the motors by a volume controlled pump that produces a substantially more constant quantity delivered per time unit, the pressure at the base-load motor varies with the load. Since the load existing before and after switching may be assumed to be the same, the working pressure at the base-load motor drops as soon as the stand-by motor is switched on. Supposing that both engines are equal, switching on the stand-by motor will cause the working pressure to sink to half the previous working pressure that prevailed when only the base-load motor had been active. If the control device would always respond to the same limit value only, the base-load motor would be turned off after the switching on of the stand-by motor and the decrease in the working pressure. This would result in a repeated activation and deactivation of the stand-by motor. According to the present invention, the control device shows a hysteretic behavior. In other words: the stand-by motor is turned on upon reaching an upper limit pressure and the deactivation of the stand-by motor is effected at a lower limit pressure that is considerably less than the upper limit pressure.

The control device of the present invention is not only suitable for controlling hydraulic rotary motors, but also for controlling hydraulic linear motors such as piston-cylinder units, for instance. In this case, too, there is the problem that, usually, a single piston-cylinder unit covers the base load and that upon the occurrence of a higher load, however, a further piston-cylinder unit must be joined in.

The present invention allows to use the higher delivery pressures of modern hydraulic pumps to perform a given work which is done by a single base-load motor operating at high working pressures. Only when the output of the base-load motor is insufficient, will the stand-by motor be switched on automatically to support the base-load motor. The deactivation of the stand-by motor is also done fully automatic. In this manner, the aggregate of the pump can be operated at high efficiency and at a good energy exploitation with a comparatively low mass flow of pressure.

In the simplest case, the control device may be designed such that it measures the working pressure at the base-load motor and provides a signal upon reaching either the upper limit pressure or the lower limit pressure. This signal is then processed in dependence of the operational state of the base-load motor in order to generate a control signal for the stand-by motor. This signal processing may be done electrically, i.e. by a microprocessor. Under the rough conditions of implementation with ground-boring devices and the like, a hydraulic control and switching device may be more advantageous since it is less susceptible to troubles and damages than an electric control device.

It is not necessary that the base-load motor is a single motor. The base-load motor may consist of two or even more individual motors that are permanently activated and that may be joined by a stand-by motor in case of need. Further, it is possible to switch on a plurality of stand-by motors in a step-wise manner depending on the working pressure, first activating one stand-by motor upon reaching an upper limit pressure. If the upper limit pressure is again reached with both motors being activated, a second stand-by motor may be switched on.

The control device of the present invention is designed particularly for implementation in ground and rock drilling machines having a drill tool provided at the front end of the drill rod. In this case, the control device is used for the rotary drive of the drill rod.

The following is a detailed description of embodiments of the present invention with reference to the accompanying drawings.

DESCRIPTION OF THE PREFERRED EMBODIMENTS

Figure 1:
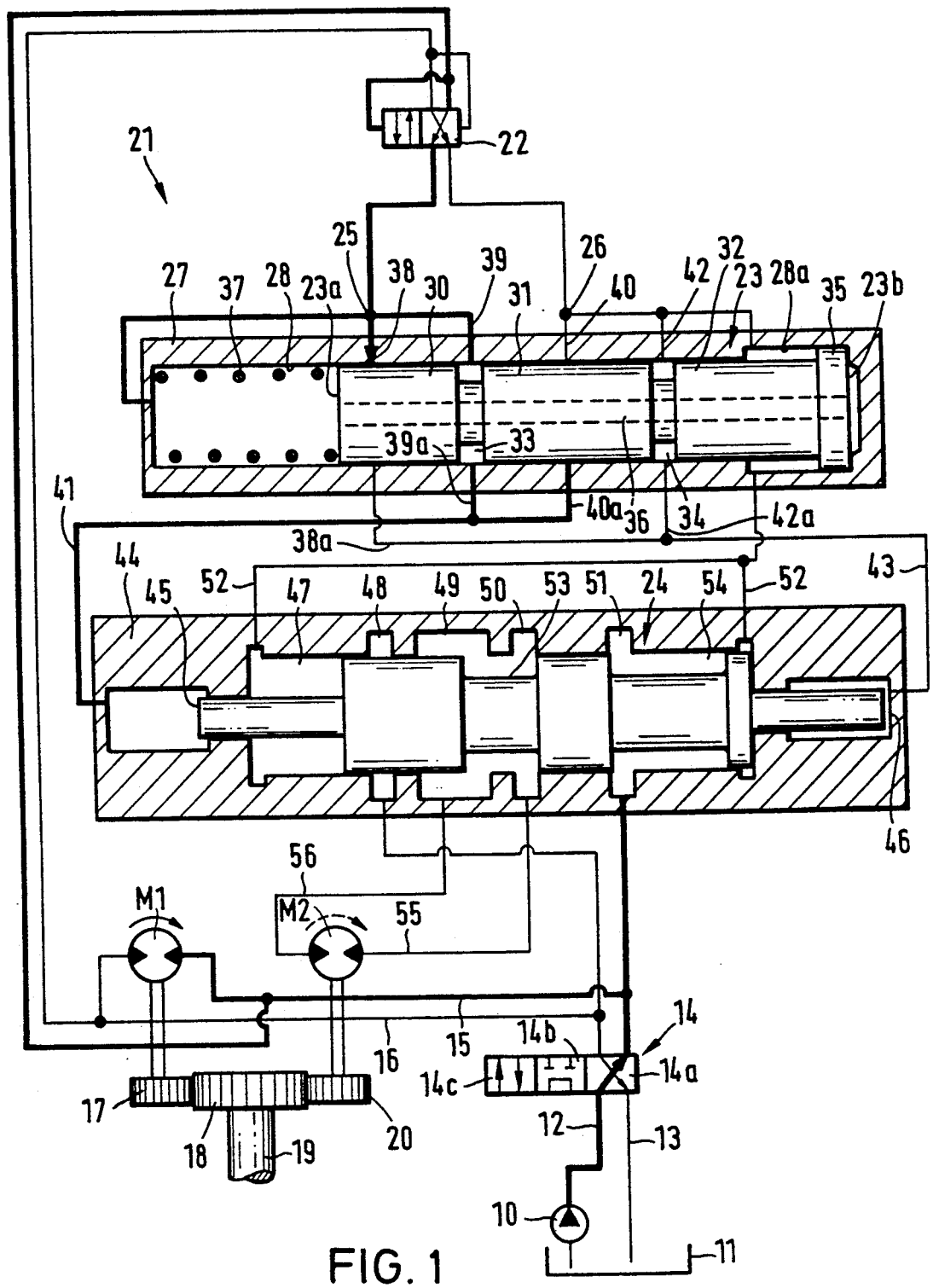
FIG. 1 is a first embodiment of the control device of the invention with a control slide and a regulating slide at low load and during clockwise rotation.

In the embodiment of FIGS. 1 to 5, a pump 10 supplies pressure fluid from a sump 11 to a pressure conduit 12. A non-pressurized reflux line 13 leads back to the reservoir 11. The conduits 12 and 13 are connected with supply conduits 15 and 16 through a manually operable direction control valve 14. These supply conduits are immediately connected to the base-load motor M1. The base-load motor M1 drives a pinion 17 that meshes with a gear wheel 18 connected with the output shaft 18 that may drive the drill rods of a drilling device for example. Moreover, the gear wheel 18 meshes with the pinion 20 that is coupled to the output shaft of the stand-by motor M2.

When the direction control valve 14 is in its position 14a, as illustrated in FIG. 1, the supply conduit 15 is connected with the pressure conduit 12 and the supply conduit 16 is connected with the reflux conduit 13, which causes the clockwise rotation of the baseload motor M1.

In the position 14b of the direction control valve 14, the pressure line 12 is coupled directly with the reflux conduit 13 and both motors are deactivated.

In the position 14c of the direction control valve 14, the supply conduit 16 is connected with the pressure conduit 12 and the supply conduit 15 is connected with the reflux conduit 13. In this state, the base-load motor M1 will rotate counterclockwise.

The supply conduits 15, 16 are connected with the switching device 21 in order to switch on the stand-by motor. The switching device 21 has a shuttle valve 22, a control slide 23 and a regulating slide 24. The shuttle valve 22 is controlled by the pressures of the supply conduits 15, 16. It connects that supply conduit with a pressure inlet leading to the control slide 23, which holds the higher pressure, and connects the other supply line, the one holding less pressure, to a reflux inlet 26 leading to the control slide.

The control slide 23 is accommodated displaceably within a housing 27 having an elongate bore 28 of constant diameter. Only one end of the housing is provided with a portion 28a of the bore with a larger diameter. The control slide 23 has three blocking surfaces 30, 31, 32 between which passages 33, 34 are arranged in the form of control grooves. In the portion 28a of the bore, there is provided a piston surface 35 of enlargened diameter.

The control slide 23 has a bore 36 going through its entire length. A spring 37 supported in the housing 27 or cylinder urges the control slide 23 towards the portion 28a.

The pressure inlet 25 is connected with the one end of the housing 27 so that both end faces of the control slide 23 are always subjected to the same pressure through the bore 36. Since the piston surface 35 is larger than the end face facing to the spring 37, the hydraulic force is predominant, trying to compress the spring 37.

A conduit 38 leads from the pressure inlet 25 into the cylinder chamber of the control slide. This conduit 38 is interrupted by the blocking surface 30 and is continued by the conduit portion 38a. A further conduit 39 leads from the pressure inlet 25 into the cylinder. This conduit 39 ends in a portion where the passage 33 is located in the rest position. The conduit is continued by the conduit 39a.

A conduit 40 leads from the reflux inlet 26 into the cylinder. In the rest position of the control slide, this conduit 40 meets with the blocking surface 31 and it is continued by a conduit 40a that is connected with the conduit 39a and forms the first control conduit 41.

In the rest position of the control slide, a conduit 42 leads from the reflux inlet 26 to the passage 34 and continues as the conduit 42a connected with the conduit 38a and forming the second control conduit 43.

Further, the reflux inlet 26 is connected with the portion 28a of enlargened diameter so that this portion is permanently non-pressurized.

Since the hydraulic force acting on the end wall 23b facing away from the spring 37 is greater than the hydraulic force acting on the opposite smaller end wall 23a, and since the pressure forces acting in the passages 33 and 34 compensate each other, a force is exerted on the control slide 23 that is proportional to the working pressure at the pressure inlet 25 and which tends to compress the spring 37. Accordingly, the control slide 23 takes a position proportional to the working pressure.

In the rest position, i.e. when no working pressure is present, the blocking surface 30 interrupts the conduit 38 and the blocking surface 31 interrupts the conduit 40. In contrast thereto, the passage 33 connects the conduit 39 with conduit 39a and the conduit 42 with conduit 42a. As a result, the first control conduit 41 is pressurized, as illustrated in FIG. 1, while the second control conduit 43 is non-pressurized.

The two control conduits 41 and 43 control the regulating slide 24 that is displaceable within a housing 44. The control conduit 41 acts on the one end 45 and the control conduit 43 acts on the opposite end 46 of the regulating slide 24. The control conduit with the higher pressure shifts the regulating slide 24 towards the other control conduit. The other hydraulic pressures compensate within the regulating slide 24 so that the regulating slide 24 is urged either in the one or the other direction by the control conduits 41 43 exclusively.

The cylinder chamber 47 in which the regulating slide 24 is displaceable, is provided with control grooves 48, 49, 50 and 51. Its two ends are connected with relief conduits 52. The regulating slide 24 has passages 53 and 54 in the form of control grooves that may connect two of the control grooves of the cylinder, respectively.

The control grooves 49 and 50 are connected with the two connections of the stand-by motor M2, the control groove 48 is connected with the supply conduit 16 and the control groove 51 is connected with the supply line 15.

With a low load at the drill rods 19, the control slide 23 takes the position illustrated in FIG. 1, whereby the control conduit 41 is pressurized and the control conduit 43 is non-pressurized. Thereby, the regulating slide 24 is shifted into the right end position, in which both connections of the stand-by motor M2 are connected through the control grooves 49 and 50. The control groove 48 is non-pressurized, while the control groove 51 is pressurized, however, these grooves are each blocked. Due to the short-circuit of the stand-by motor M2, this motor rotates at idle with the base-load motor M1. Thus, the stand-by motor acts as a pump working at idle, but performing no actual work. The actual work is performed entirely by the base-load motor M1.

When the load moment increases, the pressure to be provided by the quantity-regulated pump 10 increases and the control slide 23 is displaced according to this amount of pressure against the action of the spring 37. In doing so, the blocking surfaces 31 and 32 move into the area of the conduits 39 and 42. No change occurs in the conduits 39a and 42a for they are cut off. The regulating slide thus remains in the position previously taken. Accordingly, the drive is effected by the base-load motor M1 exclusively, as illustrated in FIG. 1.

Figure 2:
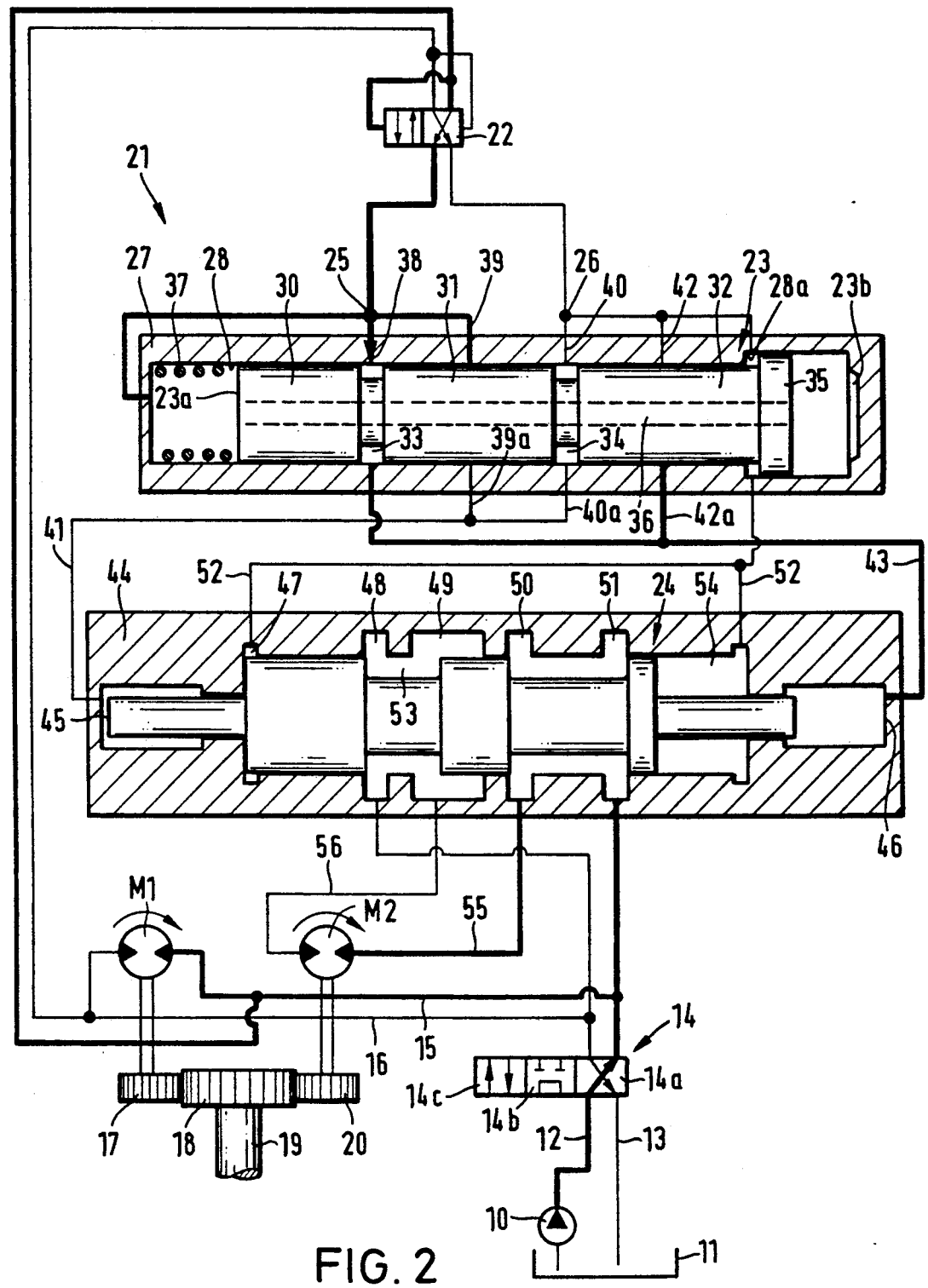
FIG. 2 is an illustration of the device of FIG. 1 at high load and during clockwise rotation.

FIG. 2 illustrates the state in which the pressure at the base-load motor and, accordingly, at the control slide has reached the upper limit pressure. In this state, the conduits 38 and 38a are connected by the control groove 33 and the control conduit 43 is pressurized, while the control conduit 41 is non-pressurized due to the connected conduits 40 and 40a.

Thereby, the regulating slide 24 is urged into the left end position in which the control groove 54 connects the passages 50 and 51, while the control groove 53 connects the passages 48 and 49. Pressure is supplied to the stand-by motor M2 at a conduit 55 via the passage 50 and its other conduit 56 becomes non-pressurized via the passage 49. As illustrated in FIG. 2, the stand-by motor M2 is driven in the same sense of rotation as the main-load motor M1.

Figure 5:
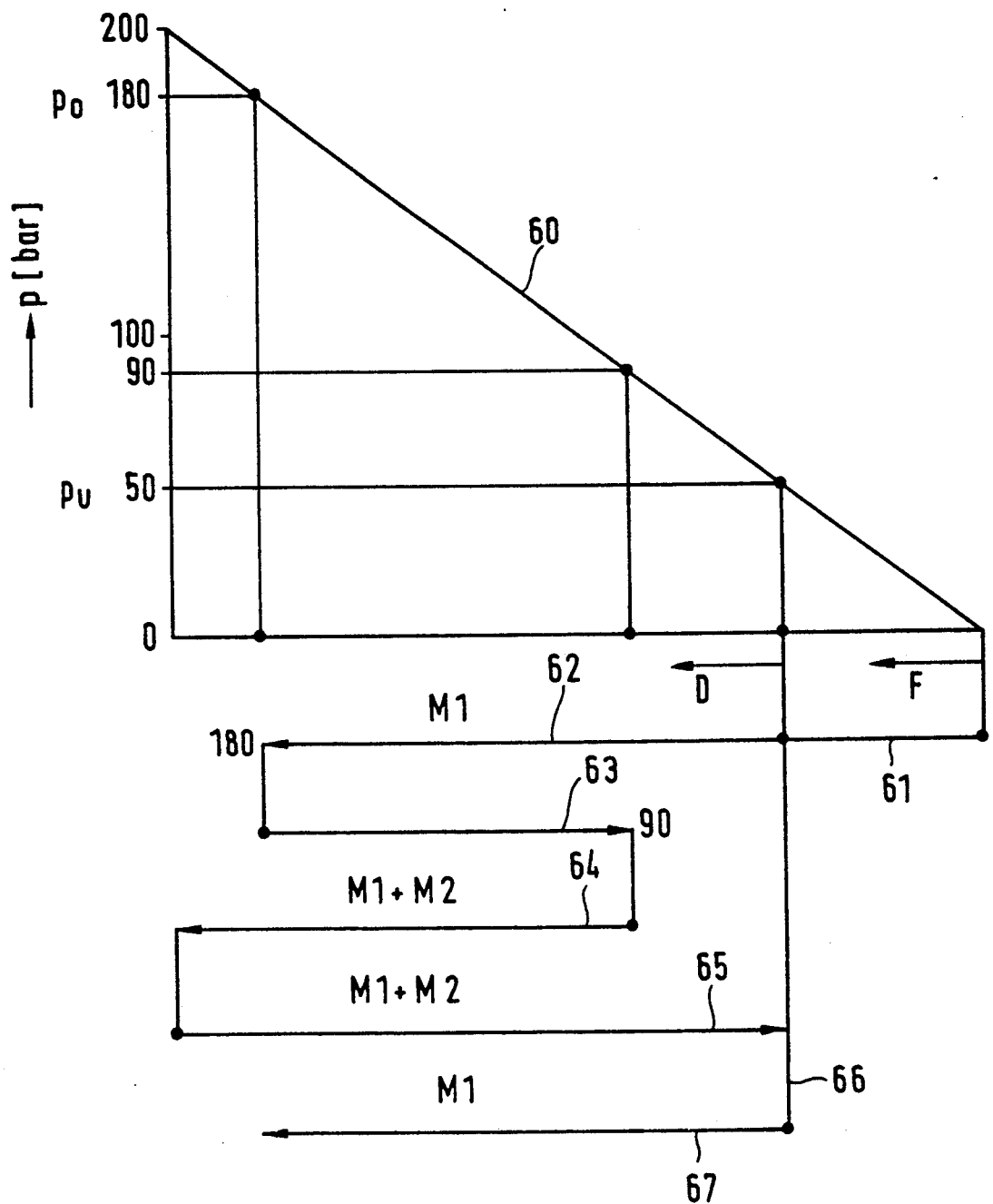
FIG. 5 is a diagram for illustrating the dependence between the path of displacement of the control slide and the working pressure for the embodiment of FIGS. 1-4.

In FIG. 5, the ordinate represents the pressure p, whereas the abscissa is representative of the displacement path D of the control slide 23 or the force F of the spring 37. The displacement path D and the force F of the spring extend along the straight line 60. The portion 61 represents the bias of the spring 37. In this portion, the control slide 23 is not displaced. In the portion 62, the control slide 23 is displaced continuously against the action of the spring 37 up to an upper limit pressure $p_o$ until the state illustrated in FIG. 2 has been reached, which corresponds to a value of $p_o = 180$ bar. Then, the stand-by motor M2 is switched on. Since both motors M1 and M2 are of the same construction, the pump pressure at 63 is instantaneously reduced by half, namely to 90 bar, given that the load moment does not change during the switching. The line 64 represents the case in which both motors M1 and M2 are driven and the load still increases. As a result, the working pressure also rises and it may exceed the upper limit pressure $p_o$ defined by the control slide 23 and reach the capacity limit of the pump.

The line 65 is representative of the case in which the load drops again with both motors M1 and M2 activated.

Upon reaching the lower limit pressure $p_u$ that is considerably lower than half the upper limit pressure $p_o$, the stand-by motor M2 is deactivated as at 66. This is done when the control slide 23 has again taken the position illustrated in FIG. 1, i.e. at the pressure that is determined by the bias of the spring 37. In the present embodiment, this lower limit pressure $p_u$ is 50 bar. Line 67 in FIG. 5 represents the case in which the rotation of the drill rods is again done exclusively by means of the base-load motor M1, as indicated at 62.

The diagram of FIG. 5 has been described for an example in which both motors M1 and M2 have the same capacity. If these motors have different capacities, i.e. the motor M1 has the capacity $P_1$ and the motor M2 has the capacity $P_2$, the lower limit pressure $p_u$ must be selected to be smaller than $P_1/(P_1+P_2) \times p_o$. This is also true for the case where the base-load motor consists of a plurality of individual motors.

Figure 3:
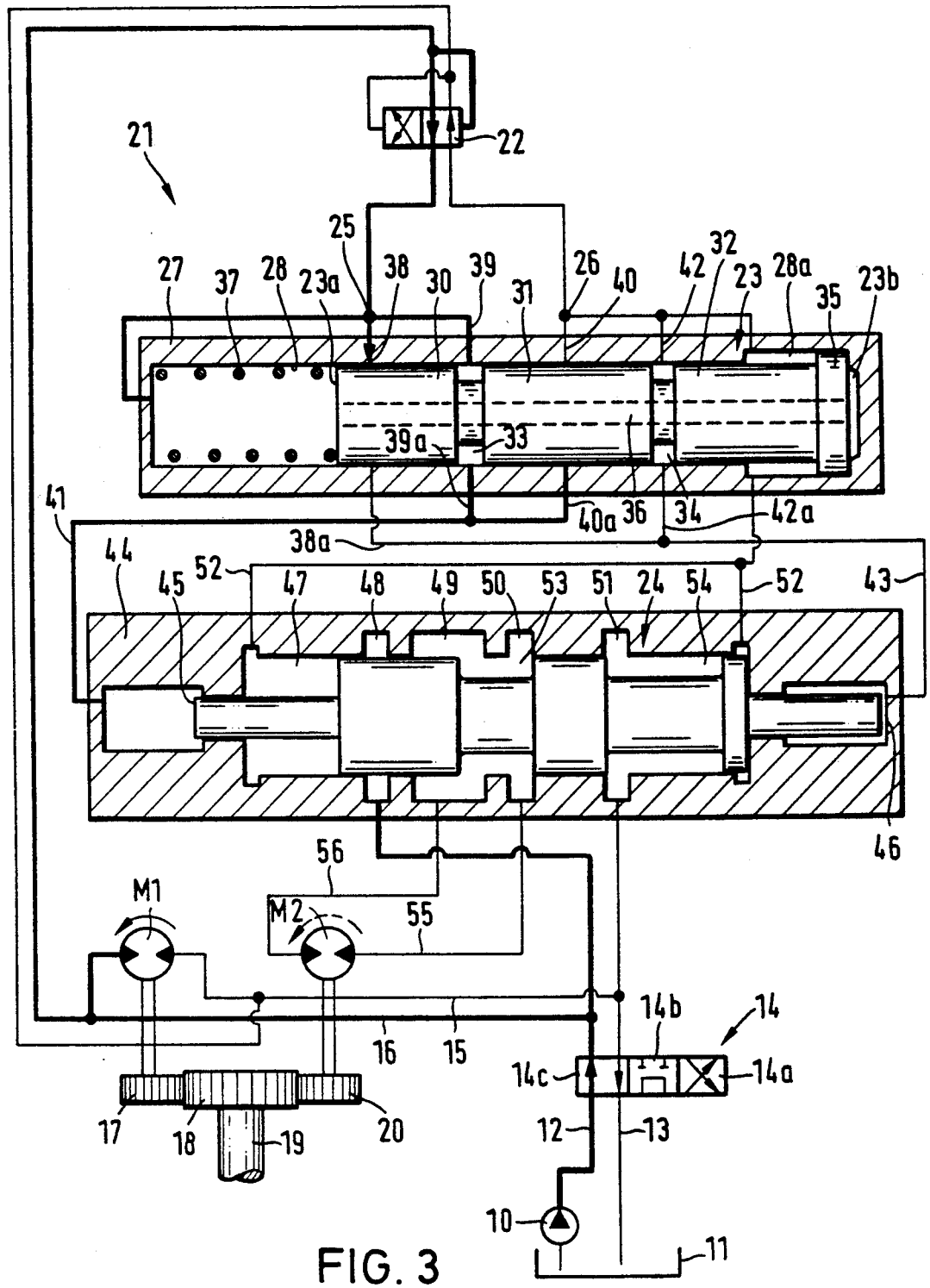
FIG. 3 illustrates the control device at low load and during counterclockwise rotation.
Figure 4:
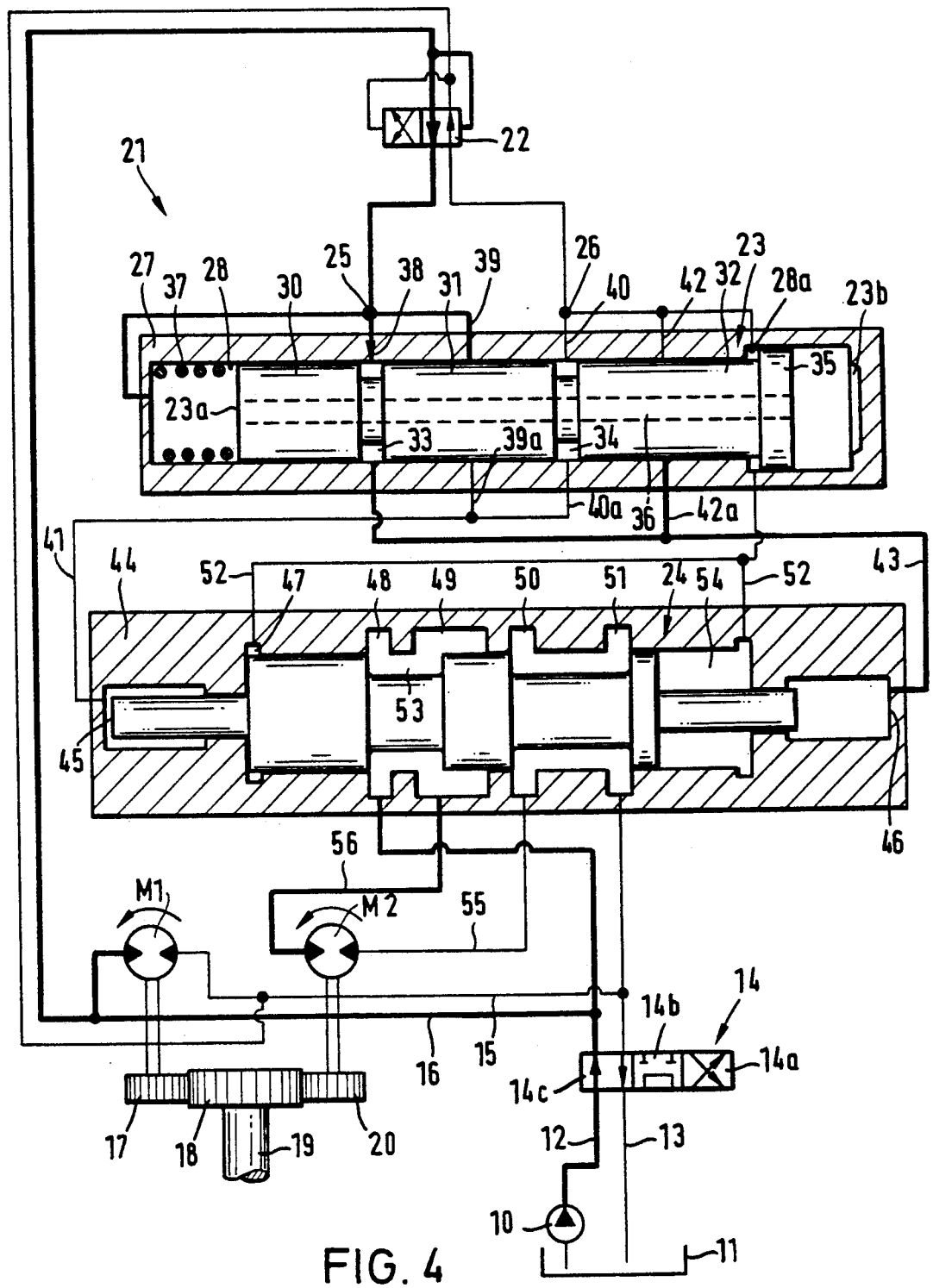
FIG. 4 illustrates the control device at high load and during counterclockwise rotation.

Referring to FIGS. 3 and 4, the following is a description of the conditions for the counterclockwise rotation of the motors, i.e. when the direction control valve 14 is set at the position 14c. In this case, the supply conduit 16 is pressurized, while the supply conduit 15 is not. Thus, the base-load motor M1 is driven in counterclockwise direction first. The direction control valve 22 has the effect that the control slide 23 is operated in the same way as in clockwise rotation.

In the case of a low load, i.e. when the working pressure of the base-load motor M1 is lower than the upper limit pressure $p_o$, the passages 49 and 50 of the housing of the regulating slide 24 are again connected by the control groove 53 of the regulating slide, as illustrated in FIG. 3, whereby the conduits 55 and 56 of the stand-by motor M2 are connected and the stand-by motor runs at idle.

Upon reaching the upper limit pressure $p_o$, the passage 49 is connected with the now pressurized passage 48, as illustrated in FIG. 4, and the passage 50 is connected with the non-pressurized passage 51. Thus, the stand-by motor M2 is driven counterclockwise.

The stand-by motor is deactivated again by the control slide 23 taking the initial position shown in FIG. 3.

Figure 6:
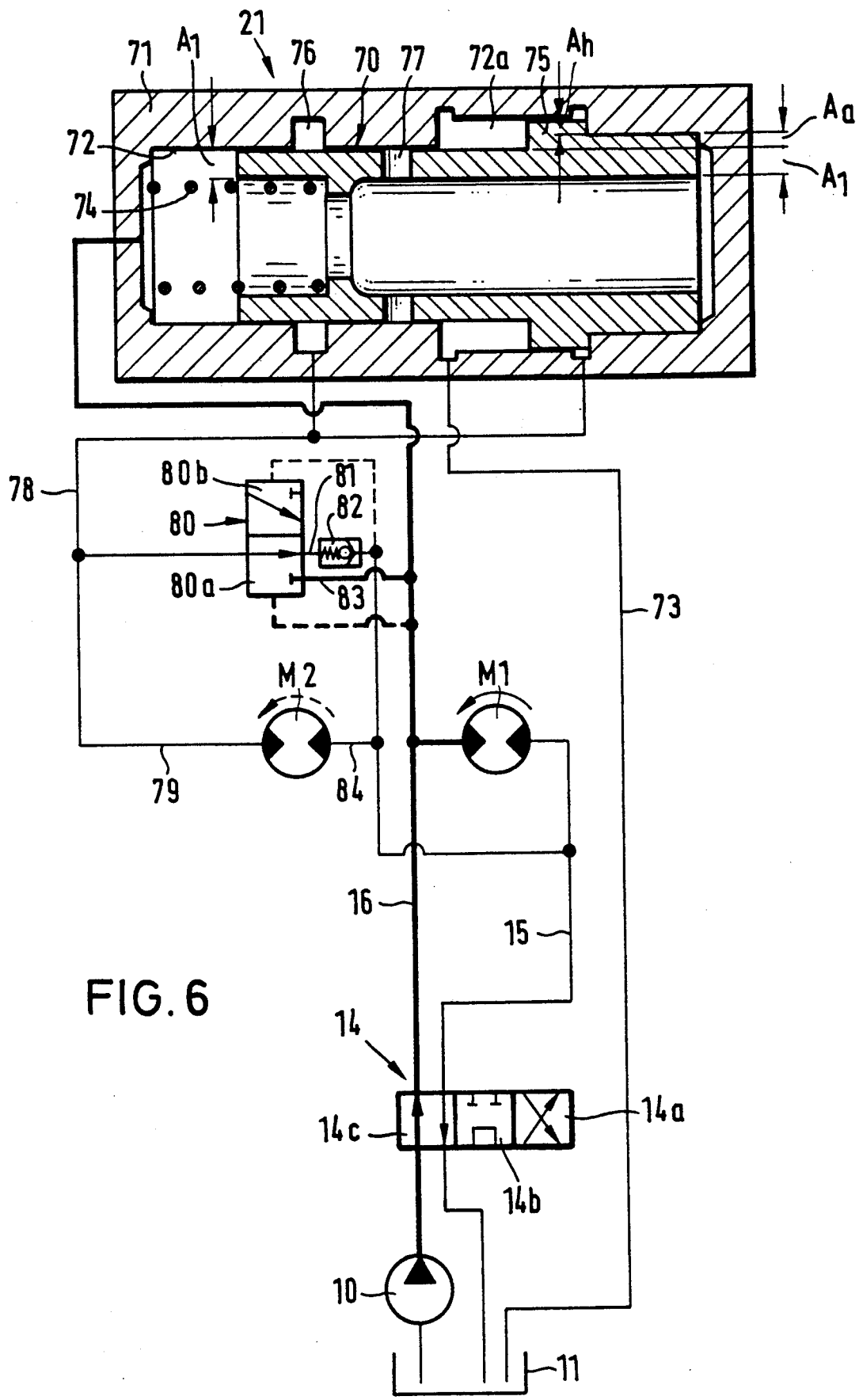
FIG. 6 is a second embodiment at low load and during counterclockwise rotation.
Figure 7:
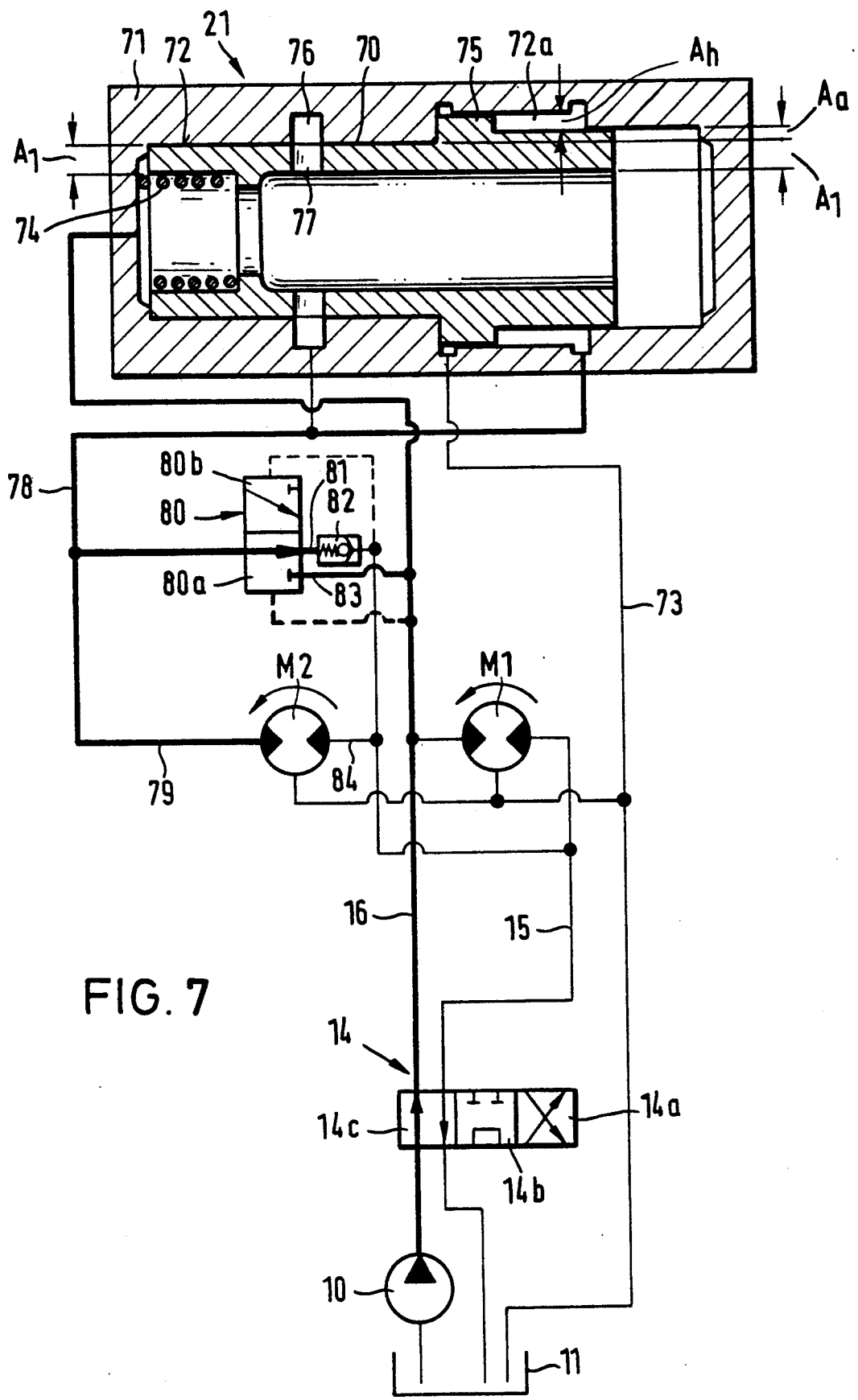
FIG. 7 is the second embodiment at high load and during counterclockwise rotation.
Figure 8:
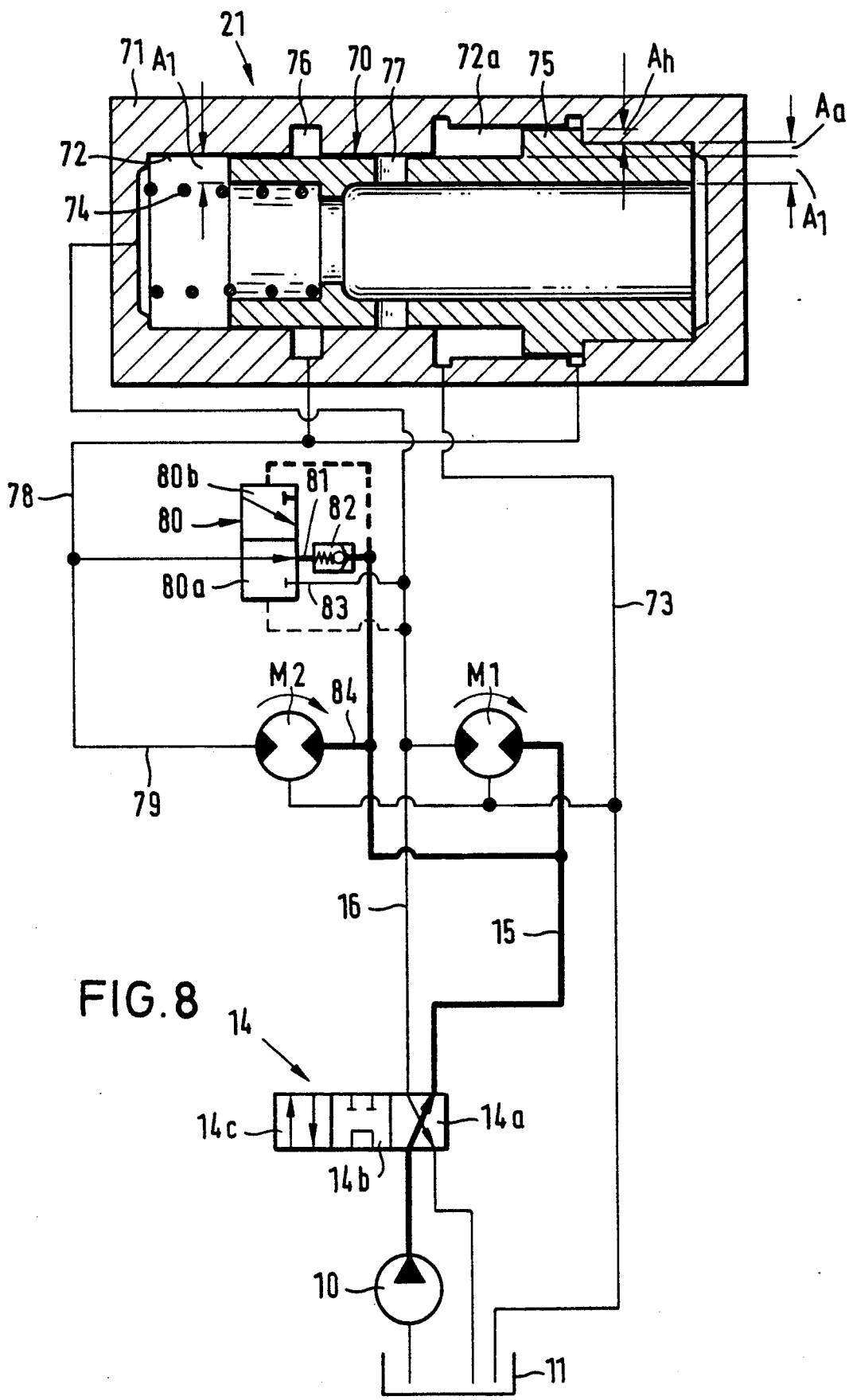
FIG. 8 is the second embodiment during clockwise rotation, both at high and at low load.

In the embodiment of FIGS. 6 to 8, the switching device has a control slide 70 which also has the functions of the regulating slide. This control slide 70 is arranged in a cylindrical housing 71 with a cylindrical bore 72. At the one end of the cylindrical housing 71 the cylindrical bore 72 has a portion 72a of an enlargened diameter. This portion 72a is permanently connected with the reflux conduit, i.e. with the sump 11, via a conduit 73. A spring 74 is supported at the opposite end of the cylindrical housing 71, which presses against the one end of the control slide 70. At the portion 72a, the control slide has an enlargement 75, the end of which facing away from the non-pressurized chamber forms an abutment face $A_h$. In the present embodiment, the control slide 70 is hollow so that the pressure prevailing at its two ends is always equal. The end of the control slide facing toward the spring 74 forms the one end surface $A_1$ and the end facing away from the spring forms the other end surface which is larger than $A_1$ and has a dimension of $A_1 + A_a$. The excess surface forms the control surface $A_a$.

An annular groove 76 is formed in the cylindrical housing 71, which may cooperate with radial passages 77 of the control slide 70. The supply conduit 16 leads into the one end of the cylindrical housing 71 and a conduit 78 is connected to the annular groove 76 and the end of the portion 72a that is located on the side which, with respect of the enlargement 75, is opposite the connection of conduit 73. Conduit 78 is connected, on the one hand, to the one connection 79 of the standby motor M2 and, on the other hand, to the inlet of a shuttle valve 80 which is controlled by the pressures from the supply conduits 15 and 16.

When pressure prevails in the supply conduit 16, as in FIG. 6, while the supply conduit 15 is non-pressurized, the shuttle valve 80 is in the position 80a in which the conduit 78 is connected with the conduit 15. Behind the corresponding connection 81 of the shuttle valve 80, a check valve 82 is provided that allows passage of pressure fluid only in the direction from the supply conduit 15 to the conduit 78, while it blocks passage in the other direction. The other connection 83 of the shuttle valve 80 is connected with the supply conduit 16. In the position 80b of the shuttle valve 80, the conduit 78 is connected with the outlet 83 and thus with the supply conduit 16.

The second embodiment operates as follows: in the illustration of FIG. 6, the motor M1 is switched to counterclockwise rotation by the direction control valve 14. The supply conduit 16 is pressurized, whereas the supply conduit 15 is not. At low load and low working pressure, the spring 74 urges the control slide 70 into the right-hand end position. In this case, the passages 77 are spaced from the annular groove so that the conduit 78 is not supplied with pressure. The shuttle valve 80 is in the position 80a. The stand-by motor M2 is in a short-circuit condition. The stand-by motor M2 that is driven at idle by the base-load motor M1 moves hydraulic oil without pressure from its connection 84 through the check valve 82 that is open in this direction and the shuttle valve 80 to the connection 79. This establishes a closed short-circuit loop across the stand-by motor M2. Oil is circulated in this short-circuit loop without pressure.

At a greater load, the working pressure at the supply conduit 16 rises. When the force generated at the control surface $A_a$ exceeds the bias of the spring 74, the control slide starts to move against the action of the spring 74. Upon reaching the upper limit pressure, the passages 77 move into the area of the annular groove 76. As indicated in FIG. 7, the conduit 78 is then supplied with pressure from inside the control slide 70, whereby pressure also reaches the abutment face $A_h$. The abutment face $A_n$ is larger than the control surface $A_a$. The ratio $A_h/A_a$ is preferably about 60/40. When the working pressure drops to half the upper limit pressure $p_o$ after the stand-by motor M2 has been switched on, the surfaces $A_h$ and $A_a$ of the control slide 70 supporting each other together still keep the spring 74 in a compressed state.

The pressure in the conduit 78 drives the stand-by motor M2 in the same sense of rotation as the base-load motor M1. The shuttle valve 80 remains in the state it was in before. The pressure at the conduit 78 is blocked at the check valve 82.

Only when the pressure at the control slide 70 becomes so low that the surfaces $A_h$ and $A_a$ cannot withstand the counterforce exerted by the spring 74, will the control slide 70 move backwards at a lower limit pressure $p_u$. When the passages 77 have left the area of the annular groove 76, no more pressure is available for driving the stand-by motor M2 so that the state illustrated in FIG. 6 is obtained again.

Figure 9:
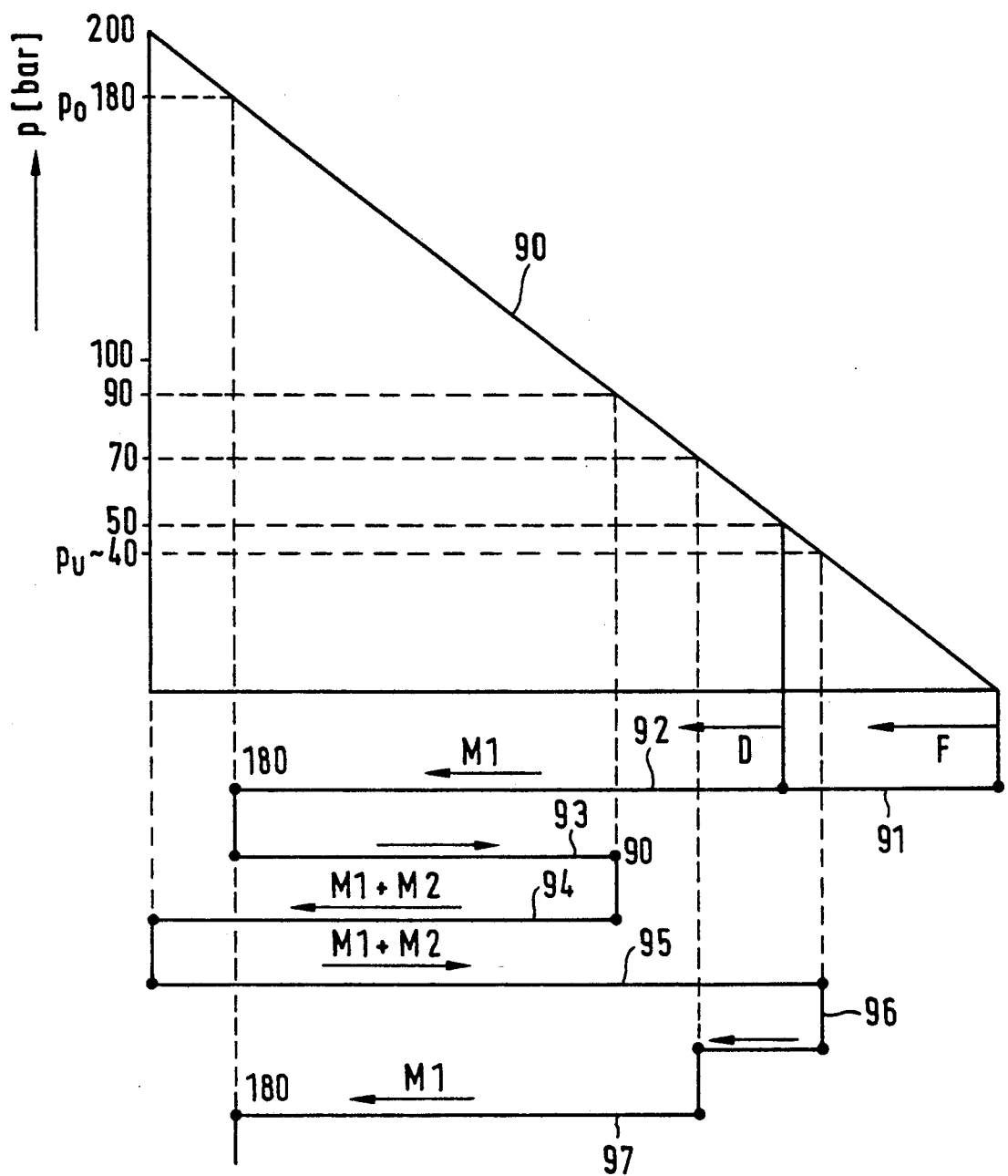
FIG. 9 is a diagram for illustrating the dependence between the path of displacement of the control slide and the working pressure for the embodiment of FIGS. 6-8.

The operation of the switching device of FIG. 6 and 7 is illustrated in FIG. 9. The ordinate represents the pressure p in bar and the abscissa represents the path D of the control slide 70 from its rest position and the force F of the spring 74. The values D and F vary in dependence of the working pressure p, as indicated by the straight line 90, given that the spring has a linear characteristic. The bias of the spring is designated by 91.

Upon an increase of the working pressure along the line 92, the stand-by motor M2 is switched on when the upper limit pressure $p_o$ of 180 bar, as indicated at 93, is reached, whereby the working pressure p drops to one half, i.e. 90 bar, given that both motors are equal. Thereafter, both motors operate commonly along line 94, the working pressure possibly also exceeding the upper limit pressure $p_o$ to an extent allowed by the pump 10. With the working pressure sinking, i.e. at reduced torque, both motors keep working commonly (line 95) until the lower limit pressure $p_u$ of approximately 40 bar is reached. The lower limit pressure is determined by the ratio between the surfaces $A_a$ and $A_h$. At 96, the stand-by motor M2 is switched off which leads to an increase in working pressure from 40 to about 70 bar. Subsequently, the operation continues along line 97 only with the base-load motor M1.

The above explanation of the embodiment of FIGS. 6 and 7 only referred to the counterclockwise rotation. When the direction control valve 14 is switched into the position 14a (FIG. 8), the drive rotates clockwise and only with both motors M1 and M2 rotating together. The supply conduit 15 is pressurized and the supply conduit 16 becomes non-pressurized. Thus, the shuttle valve 80 is switched into position 80b in which it blocks the pressure prevailing at its connection 81. The shuttle valve 80 connects the connection 79 of the stand-by motor M2 to the non-pressurized supply conduit 16 via the conduit 83. Thus, the stand-by motor M2 is supplied with pressure at its connection 84 through the supply conduit 15, while the outlet is effected via the connection 79, the shuttle valve 80 and the conduit 83 to the supply conduit 16.

I claim:

1. A control device comprising a hydraulic base-load motor (M1) supplied with a working pressure for driving a load, a hydraulic stand-by motor (M2) load-dependent connectable to the working pressure for assisting the base-load motor (M1) when the working pressure reaches an upper limit value, and switching device means (21) for responding to the working pressure at the base-load motor (M1) and activating the stand-by motor (M2) when the upper limit pressure $P_o$ is reached and deactivating said stand-by motor (M2) when a lower limit pressure $P_u$ is reached, said lower limit pressure being less than $P_1/(P_1+P_2) \times P_o$, where $P_1$ is the capacity of the base-load motor (M1) and $P_2$ is the capacity of the stand-by motor (M2) at the upper limit pressure.

2. The control device of claim 1 wherein said switching device means (21) includes a control slide (23) continuously displaceable in dependence of the pressure, and a regulating slide (24) that may take two positions, a first position corresponding to the working state and a second position corresponding to the idle state of the stand-by motor (M2), that, upon reaching the upper limit pressure ($P_o$), the control slide (23) switches the regulating slide (24) from the second into the first position and that it is provided with at least one blocking surface (30, 31) which, upon a drop in the working pressure, causes the regulating slide (24) to remain in the first position until, upon reaching the lower limit pressure ($P_u$), a passage (33, 34) of the control slide (23) causes the regulating slide (24) to switch to the second position.

3. The control device of claim 1 wherein said switching device means (21) includes a control slide (70) continuously displaceable in dependence of the pressure, having a working surface ($A_a$) subjected to the working pressure, which control slide activities the stand-by motor (M2) upon reaching the upper limit pressure ($P_o$) and simultaneously passes the working pressure to an abutment surface ($A_h$) provided at the control slide (70) such that forces acting on the working surface ($A_a$) and the abutment surface ($A_h$) add up.

4. The control device of claim 1 including a pressure conduit (12) and a reflux conduit (13), switchable by means of a direction control valve (14), which are connected to two supply conduits (15, 16) connected to the base-load motor (M1), the switching device (21) and the stand-by motor (M2).

5. The control device of claim 4 wherein said switching device means (21) is connected to the supply conduits (15, 16) by a shuttle valve (22) which connects the respective pressurized supply conduit with a pressure inlet (25) and connects the respective non-pressurized supply conduit with a reflux inlet (26) of the switching device (21).

6. The control device of claim 4 wherein the stand-by motor (M2) is short-circuited by a check valve (82) which blocks the short-circuit path for the operation of the stand-by motor (M2) and opens said path for the idle state of the stand-by motor (M2).

7. The control device of claim 4 wherein said switching device means (21) is constructed and arranged such that in the one sense of rotation the stand-by motor (M2) is activated in dependence on the working pressure and that, in the other sense of rotation, both motors are always activated.

8. The control device of claim 4 wherein said switching device means (21) is designed such that, in each sense of rotation, the stand-by motor (M2) is activated in dependence on the working pressure.

* * * * *